United States Patent [19]
Chang

[11] Patent Number: 5,301,909
[45] Date of Patent: Apr. 12, 1994

[54] STOVE CARRIER

[76] Inventor: Kwei T. Chang, No. 14, Lane 54, Luong Chuan St., Panchiao City, Taipei Hsien, Taiwan

[21] Appl. No.: 71,113

[22] Filed: Jun. 3, 1993

[51] Int. Cl.$^5$ .............................................. A47G 23/02
[52] U.S. Cl. ................................... 248/146; 248/153; 248/676
[58] Field of Search ..................... 248/145.6, 676, 153, 248/146, 175, 163.1; 211/181; 126/50

[56] References Cited

U.S. PATENT DOCUMENTS

| | | | |
|---|---|---|---|
| 1,994,195 | 3/1935 | Hay | 211/181 X |
| 2,537,501 | 1/1951 | Woodward | 248/676 X |
| 2,679,736 | 6/1954 | Duchin | 248/175 X |
| 2,837,624 | 6/1958 | Katzman | 248/153 X |
| 3,202,192 | 8/1965 | Russo | 248/153 X |
| 4,718,402 | 1/1988 | Fordyce | 248/153 X |
| 4,930,642 | 6/1990 | Brooks | 211/181 X |
| 5,092,311 | 3/1992 | Ririe | 211/181 X |
| 5,203,254 | 4/1993 | Fletcher | 211/181 X |

FOREIGN PATENT DOCUMENTS 631788 12/1927 France .......................... 248/175

*Primary Examiner*—J. Franklin Foss
*Attorney, Agent, or Firm*—Lowe, Price, LeBlanc & Becker

[57] ABSTRACT

A stove carrier including a base frame for carrying a baking stove, and a rack for carrying the cover of the baking stove, the base frame having two parallel horizontal bars and two vertical supporting frames symmetrically connected between the horizontal bars at two opposite ends. Each vertical supporting frame having a heat-resisting grip horizontally disposed at the top and two legs vertically disposed at the bottom for supporting the stove carrier on a flat surface. The rack having two opposite ends terminated to respective hooks for hooking on either vertical supporting frame. A pair of bars horizontally disposed at equal elevation relative to the parallel horizontal bars for carrying the cover of the baking stove.

3 Claims, 5 Drawing Sheets

STOVE CARRIER

BACKGROUND OF THE INVENTION

The present invention relates to a stove carrier for carrying a baking stove which has a detachable rack for holding the cover of the baking stove being carried thereon.

Various baking stoves are manufactured and widely accepted by housekeepers. A baking stove is generally comprised of a cylindrical housing and a cover with a built-in electric heater covered on the cylindrical housing at the top. As a baking stove is opened after cooking, the cover must be carefully handled. A baking stove user tends to place the baking stove on the dinner table and simultaneously prepare a heat-resisting pad on the dinner table for holding the cover of the baking stove. However, placing a baking stove on the dinner table occupies much table space.

SUMMARY OF THE INVENTION

The present invention has been accomplished under the aforesaid circumstances. It is therefore the principal object of the present invention to provide a stove carrier for carrying a baking stove which is comprised of a base frame for carrying a baking stove, and a rack detachably fastened to the base frame for carrying the cover of the baking stove. It is another object of the present invention to provide a stove carrier which is simple in structure and inexpensive to manufacture.

DETAILED DESCRIPTION OF THE PREFERRED EMBODIMENT

Figure 1:
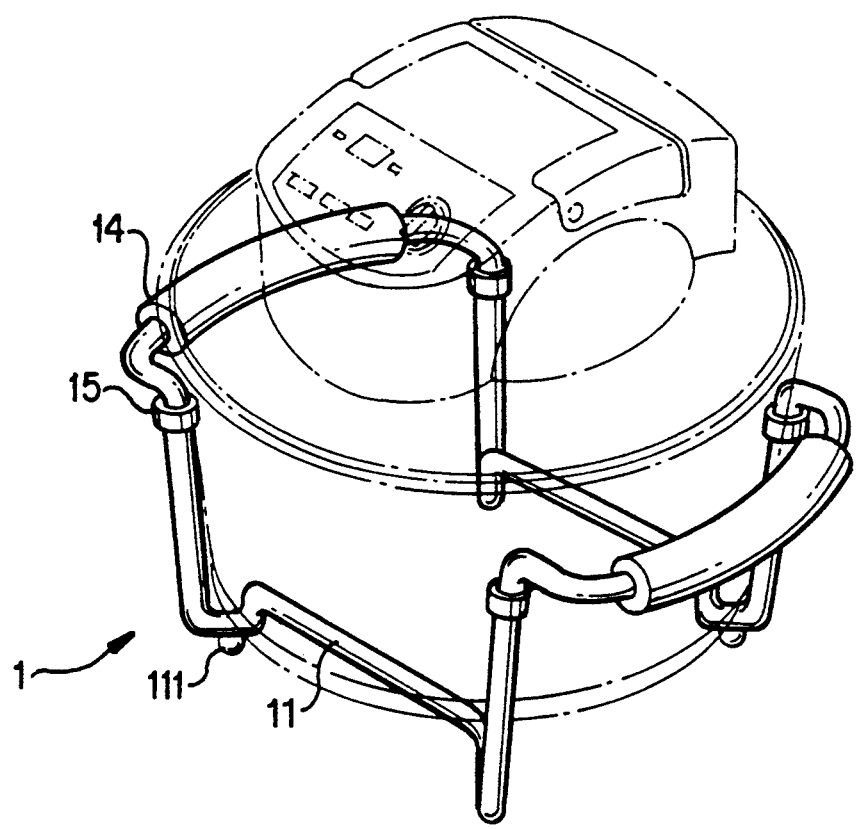
FIG. 1 illustrates a baking stove carried on a stove carrier according to the preferred embodiment of the present invention.
Figure 2:
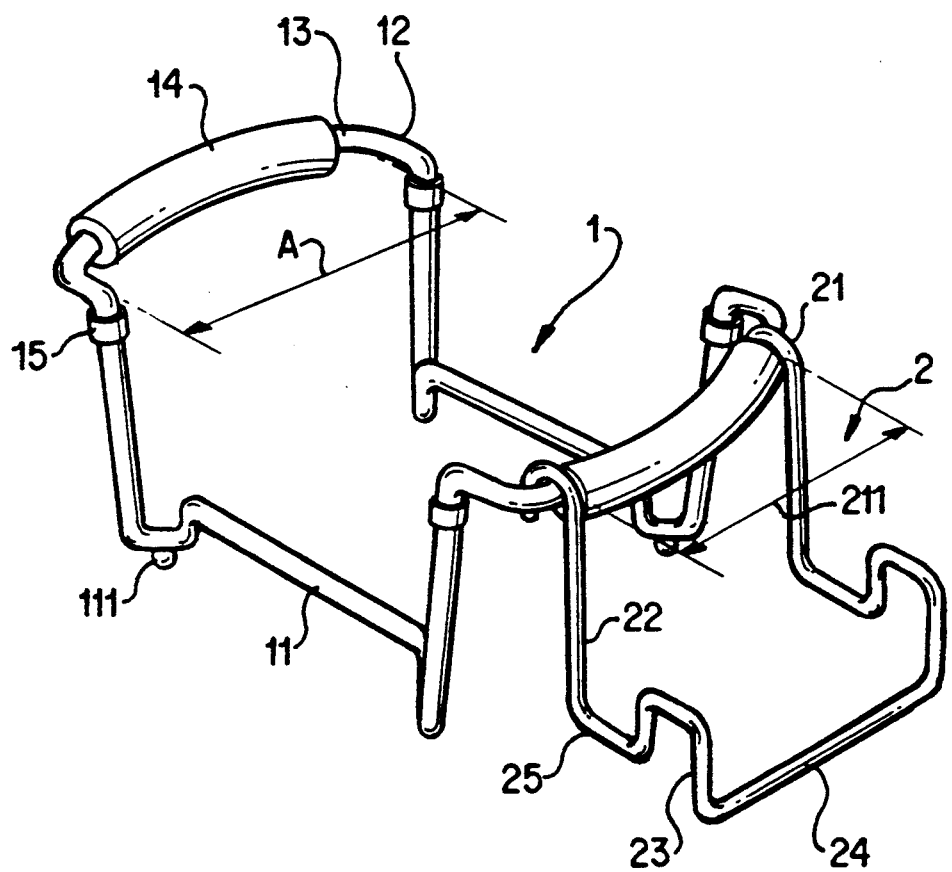
FIG. 2 is a perspective view of the stove carrier shown, in FIG. 1 with the rack attached.
Figure 3:
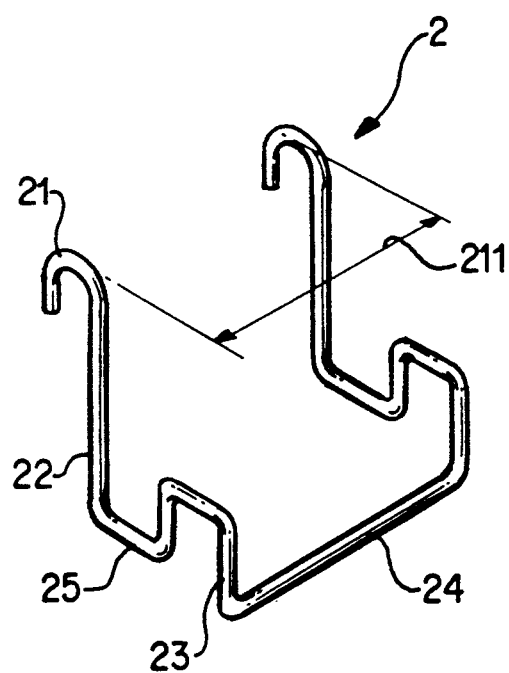
FIG. 3 is a perspective view of the rack.

Referring to FIGS. 1, 2 and 3, a stove carrier in accordance with the present invention is generally comprised of a base frame 1 for carrying a baking stove 3, and a detachable rack 2 hooked on the base frame 1 for carrying the cover 3a of the baking stove 3. The base frame 1 comprises two parallel horizontal bars 11, and two vertical supporting frames 12 connected between the horizontal bars 11 at two opposite ends. The vertical supporting frames 12 are symmetrical and respectively made in a substantially arched configuration, each having two opposite ends terminated to respective legs 111 for supporting the base frame 1 on flat surface, a middle portion 13 disposed in a horizontal position at a higher elevation above the horizontal bars 11, a heat-resisting grip 14 covered around the middle portion 13, two heat-resisting collars 15 fastened around two opposite ends of the middle portion 13. The rack 2 is made by bending an elongated rod into shape, having two opposite ends terminated to respective hooks 21, two L-shaped suspension portions 22 respectively extended from the hooks 21, a transverse middle portion 24, and two curved portions 23 respectively connected between the transverse middle portion 24 and the L-shaped suspension portions 22. The L-shaped suspension portions 22 and the curved portions 23 form into a bearer 25 for carrying the cover 3a of the baking stove 3. The pitch A between the two heat-resisting collars 15 is approximately equal to the pitch 211 between the two hooks 21.

Figure 4:
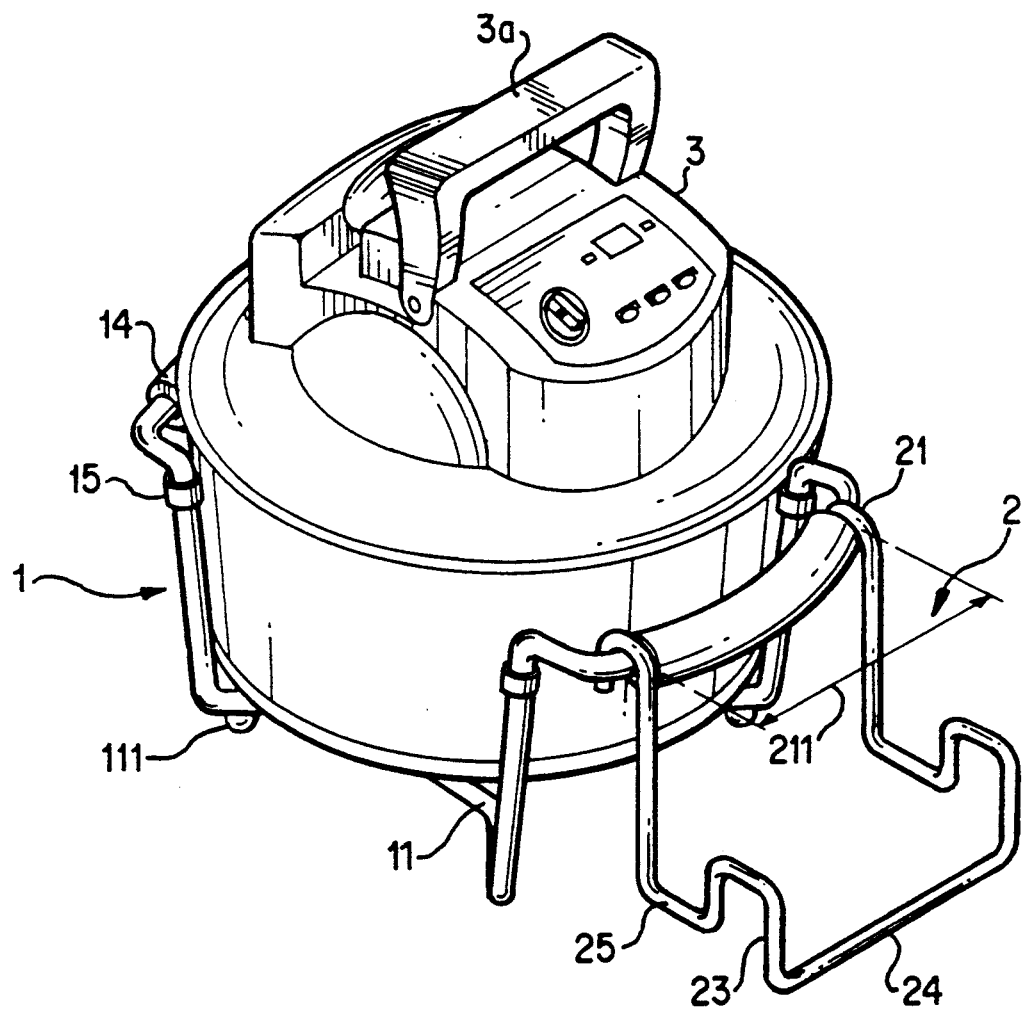
FIG. 4 illustrates a baking stove carried on the stove carrier with the rack attached.
Figure 5:
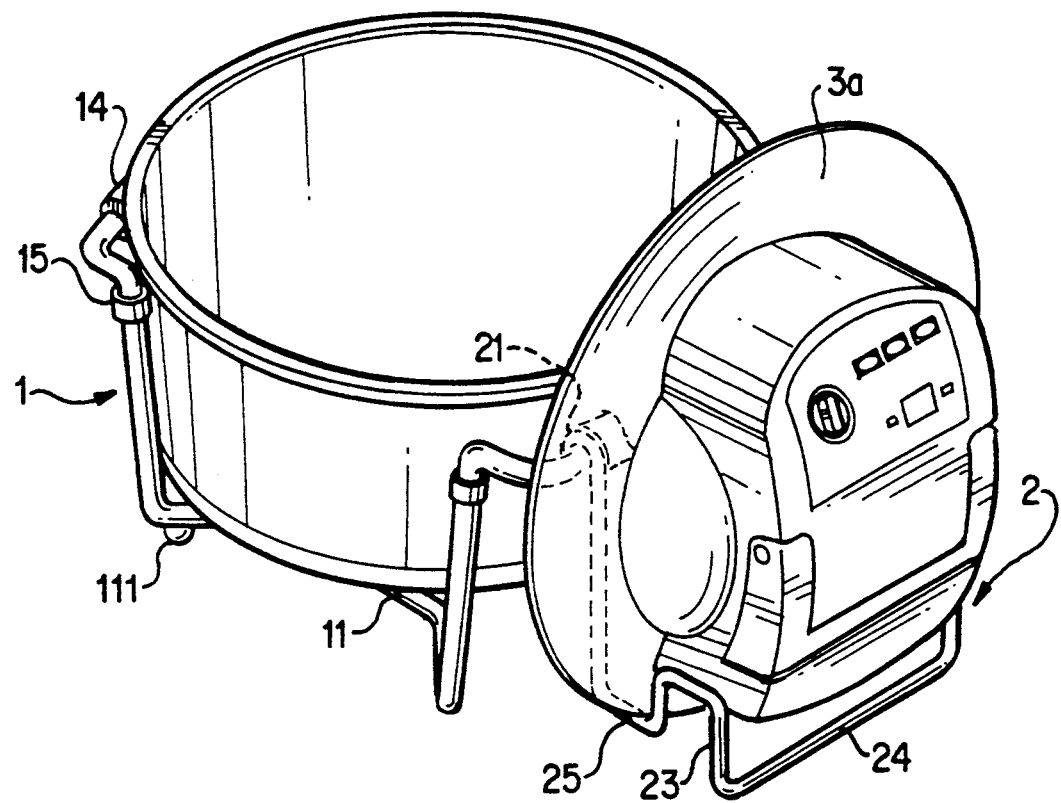
FIG. 5 is similar to FIG. 4 but showing the cover of the backing stove removed and carried on the rack.

Referring to FIGS. 4 and 5, because the pitch A between the two heat-resisting collars 15 is approximately equal to the pitch 211 between the two hooks 21, the rack 2 becomes firmly retained to the base frame 1 as the hooks 21 of the rack 2 are hooked on the horizontal middle portion 13 of either vertical supporting frame 12 and respectively stopped against the heat-resisting collars 15 at an inner side. When assembled, the bearer 25 is disposed at an elevation approximately equal to the parallel bars 11 for carrying the cover 3a of the backing stove 3.

While only one embodiment of the present invention has been shown and described, it will be understood that various modifications and changes could be made without departing from the spirit and scope of the invention.

What is claimed is:

1. A stove carrier comprising:
   a base frame for carrying a baking stove, said base frame comprising two parallel horizontal bars, and two vertical supporting frames symmetrically connected between said horizontal bars at two opposite ends, each vertical supporting frame being made in a substantially arched configuration having two opposite ends terminated to respective legs for supporting said base frame on a flat surface, a horizontal middle portion disposed at a higher elevation above said horizontal bars, a heat-resisting grip covered around said horizontal middle portion, two heat-resisting collars fastened around two opposite ends of said horizontal middle portion;
   a rack detachably fastened to said base frame for carrying the cover of the backing stove being carried on said base frame, said rack comprising two opposite ends terminated to respective hooks for hooking on the horizontal middle portion of either vertical supporting frame of said base frame, two L-shaped suspension portions respectively extended from said hooks, a cross bar portion, and two curved portions respectively connected between said cross bar portion and said L-shaped suspension portions, said L-shaped suspension portions and said curved portions forming into a bearer for carrying the cover of the baking stove.

2. The stove carrier according to claim 1 wherein said bearer of said rack is disposed at an elevation approximately equal to said parallel horizontal bars of said base frame as said bearer is hung on either vertical supporting frame of said base frame.

3. The stove carrier according to claim 1 wherein the pitch between said two heat-resisting collars is approximately equal to the pitch between said two hooks.

* * * * *